United States Patent [19]
Fields

[11] Patent Number: 4,557,829
[45] Date of Patent: Dec. 10, 1985

[54] TWO STAGE FILTER

[75] Inventor: Gerald S. Fields, Olney, Ill.

[73] Assignee: Champion Laboratories, Inc., West Salem, Ill.

[21] Appl. No.: 620,316

[22] Filed: Jun. 13, 1984

[51] Int. Cl.[4] ............................................. B01D 27/10
[52] U.S. Cl. ..................................... 210/132; 210/137; 210/315; 210/443; 210/509
[58] Field of Search ................. 210/90, 132, 137, 316, 210/DIG. 13, DIG. 17, 508, 509, 510.1, 314, 168, 440, 494.1, 494.2, 487, 315, 342, 337, 443

[56] References Cited

U.S. PATENT DOCUMENTS

| 2,098,725 | 11/1937 | Hurn | 210/168 |
|---|---|---|---|
| 2,833,416 | 5/1958 | Wilkinson | 210/440 |
| 3,344,923 | 10/1967 | Pall et al. | 210/90 |
| 3,450,632 | 6/1969 | Olson et al. | 210/508 |
| 3,467,256 | 9/1969 | Humbert, Jr. et al. | 210/342 |
| 3,487,929 | 1/1970 | Sample et al. | 210/90 |
| 3,493,110 | 2/1970 | Rosaen | 210/90 |
| 3,586,171 | 6/1971 | Offer | 210/314 |
| 3,975,273 | 8/1976 | Shaltz et al. | 210/440 |
| 4,038,189 | 7/1977 | Dison et al. | 210/90 |
| 4,048,071 | 9/1977 | Yamada et al. | 210/90 |
| 4,240,908 | 12/1980 | Swain et al. | 210/508 |

Primary Examiner—Richard V. Fisher
Assistant Examiner—Wanda L. Millard
Attorney, Agent, or Firm—Allegretti, Newitt, Witcoff & McAndrews, Ltd.

[57] ABSTRACT

A multistage filter unit comprises a housing having a closed end and an other end closed except for liquid inlet means and liquid outlet means. Within the housing are first and second filter elements. The improvement is characterized by the second filter element being comprised of a porous disc retained in or adjacent the opening of the first filter element by a foraminous element. The porous disc is deformable in response to increase in differential pressure due to clogging of the porous disc to reduce the liquid flow path through the porous disc and relieve some of the differential pressure, without opening an unfiltered path for liquid.

6 Claims, 6 Drawing Figures

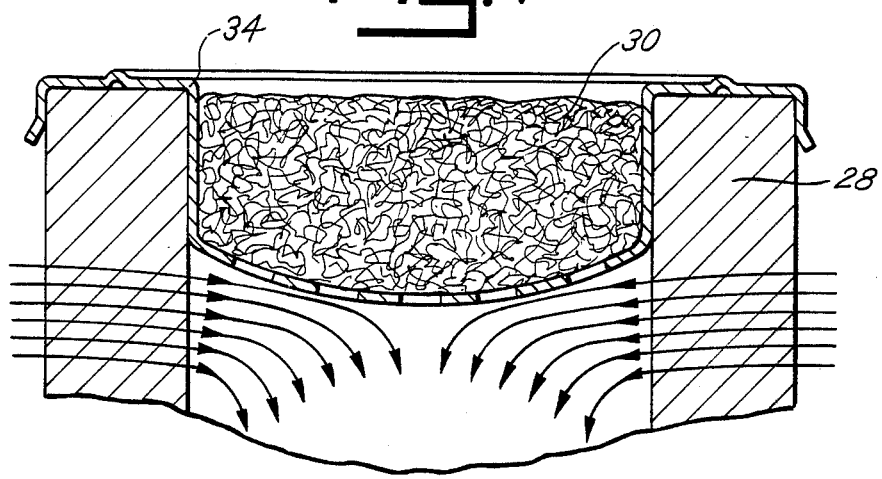
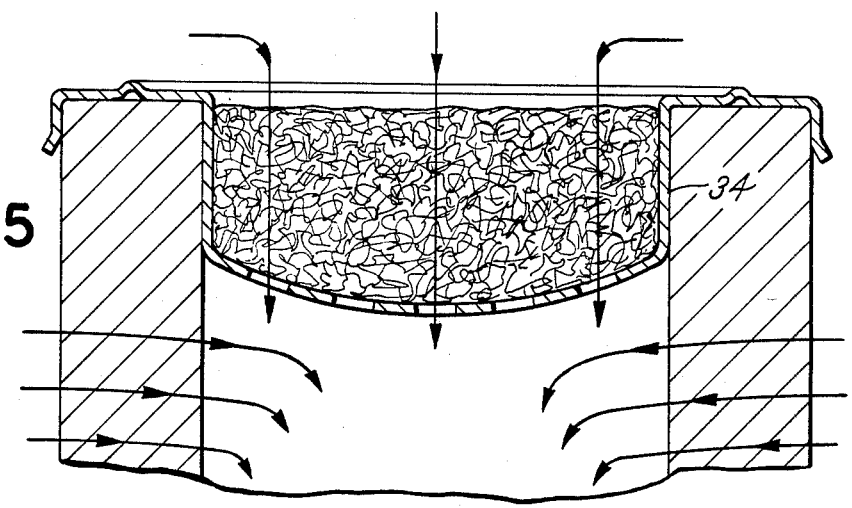
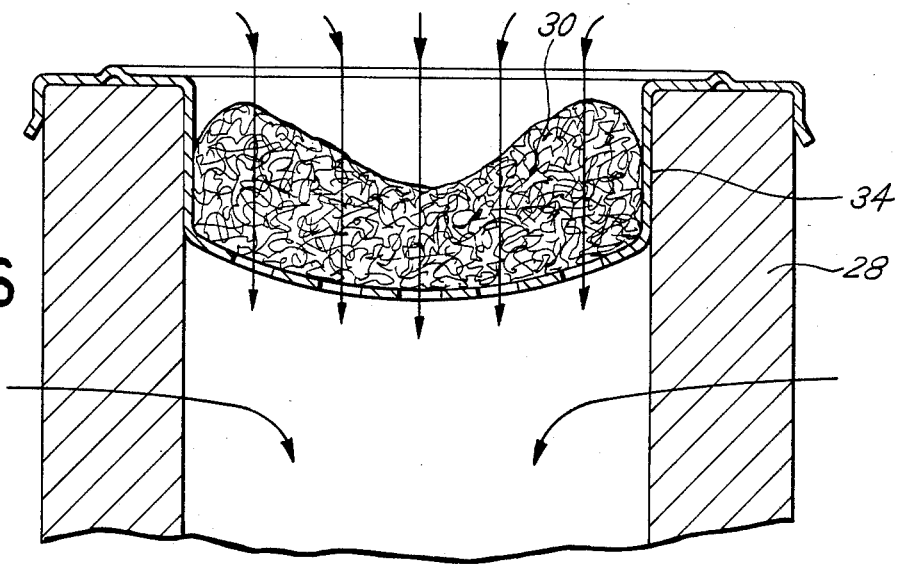

TWO STAGE FILTER

BACKGROUND OF THE INVENTION

This invention relates to two stage filters for use in a liquid lubricant circulating system of an internal combustion engine and more particularly to an improved two stage filter incorporating a primary fine filtering media and a secondary coarser filtering media, such filter constructed and arranged so as to provide higher cleaning efficiencies than prior like filters.

Dual element filters or two stage filters of different types are known. Mould et al. U.S. Pat. No. 2,998,138 and Hultgren U.S. Pat. No. 3,370,708 each shows a filter incorporating a pair of concentric, cylindrical filter elements. Humbert et al. U.S. Pat. No. 3,467,256 reveals a screw-on throwaway type filter having a casing with a pair of concentric filter elements therein.

Dison U.S. Pat. No. 4,038,189 shows a dual filter having a primary fine mesh filter element, a secondary coarser mesh filter element in parallel with the primary filter element and a plurality of bypass valves which are normally closed to block flow through the secondary filter element, but which open at an elevated fluid pressure caused by clogging of the primary filter element to allow flow through the secondary filter element.

Ball U.S. Pat. No. 3,268,077 pertains to a dual element, dual valve filter having a first filter element 51 and a second filter element 48. When the second filter element becomes clogged, a valve is opened to bypass oil about both filter elements.

Neely U.S. Pat. No. 3,269,541 pertains to a dual element dual valve filter assembly incorporating concentric filter media. In one embodiment, the inner filter media includes a flat resilient inlet valve which opens when a predetermined pressure differential is attained within the filter housing to permit passage of oil through the inner filter media.

The prior art discloses dual element filters which include separate valve elements to control flow through the secondary filter element. When the valve is opened, the flow of liquid bypasses the filter elements and unfiltered liquid is returned to the lubricating circulating system. The present invention provides a dual element filter assembly, which utilizes no separate valve member to control flow through the secondary filter element. Rather, the inventive filter incorporates a very fine first filter element and a high density coarser secondary filter element, which changes shape to accommodate increased oil flow, without opening an unfiltered path for the oil to return to the lubricant circulating system.

An object of the present invention is to provide an improved two stage liquid filter wherein deficiencies and disadvantages of prior constructions are obviated.

Another object of the present invention is to provide an improved two stage filter having a housing containing a primary fine filter and a secondary coarse filter, the secondary coarse filter deforming to relieve a portion of the differential pressure due to clogging of the primary filter, without opening an unfiltered path for the oil to return to the lubricant circulating system. Other objects and advantages of the present invention will become more apparent hereinafter.

BRIEF DESCRIPTION OF THE DRAWING

There is shown in the accompanying drawing a presently preferred embodiment of the present invention, wherein like numerals in the various views refer to like elements and wherein:

FIG. 4 is a detail cross-sectional view of the two stage filer, illustrating all flow of oil through the primary filter media, as occurs when the primary filter media is clean;

FIG. 5 is a detail cross-sectional view of the two stage filter, illustrating the flow of oil through the primary and secondary filter media as the primary filter media begins to clog; and FIG. 6 is a detail cross-sectional view of the two stage filter, illustrating the position of the secondary filter after the primary filter is substantially clogged.

DETAILED DESCRIPTION OF THE PRESENT INVENTION

Figure 1:
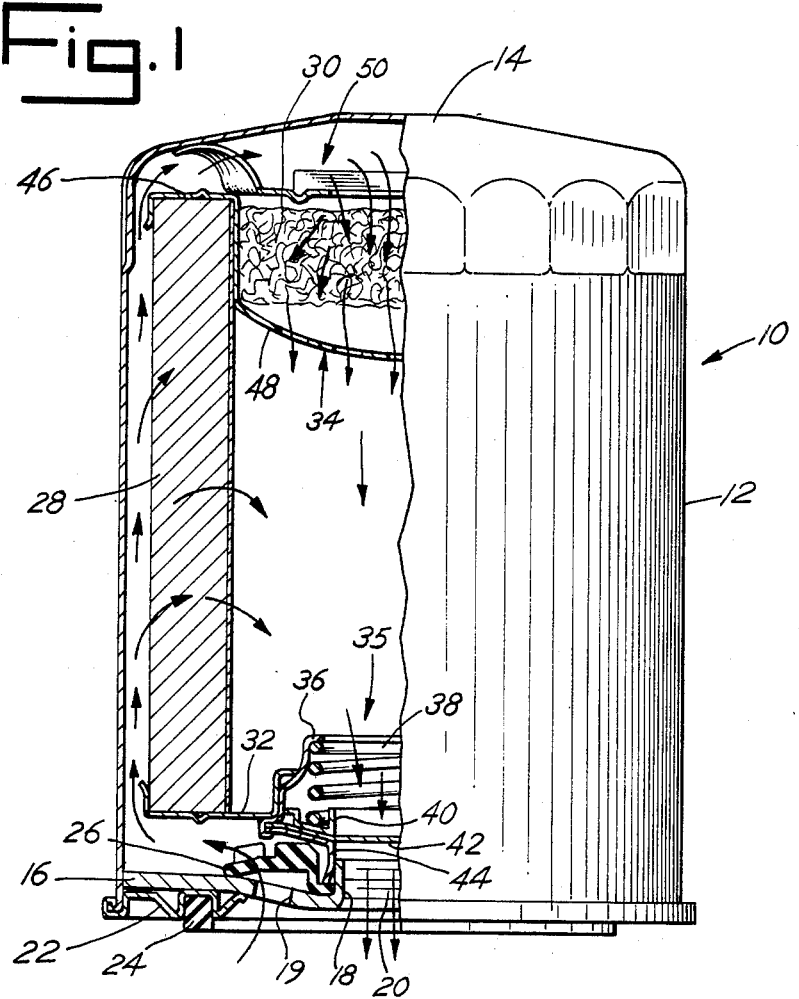
FIG. 1 is an elevation view with parts broken away of a two stage filter embodying the present invention.

With reference to FIG. 1, there is shown a filter assembly 10 embodying the present invention. Filter assembly 10 includes a shell or housing 12 having a closed top portion 14 and an end plate 16 closing the bottom or open end of the shell 12. The end plate is formed centrally with a liquid outlet 18 and with liquid inlet means 19 which may comprise a plurality of ports. The liquid outlet 18 is internally threaded as indicated at 20 to receive a nipple or adaptor pipe extending from the engine block of an internal combustion engine having a lubricant circulating system.

The end plate 16 abuts a lid assembly 22 which is connected to the shell 12 for retaining the end plate 16 in the shell. A seal ring 24, retained in an annular recess in the lid assembly 22, is adapted to abut the engine block and seal the flow of lubricant between the filter assembly 10 and the engine block.

Positioned in the shell 12 adjacent the liquid inlet means 19 is an annular check valve 26. The check valve 26 is normally closed and is opened to permit entry of lubricant to be filtered into shell 12.

Within the housing 10 are a pair of filter media or elements 28 and 30. The filter 28, which is preferably comprised of pleated paper having porosity on the order of 20–25 micron, is generally annular and cylindrical in cross section, conforming to the cross-sectional shape of the casing or shell 12 of the filter assembly 10. The second filter media 30, which is preferably in the form of a cylindrical disc made from 3-dimensional non-woven 100 percent polyester filter, is positioned and retained at an and of the opening in filter 28.

End caps 32 and 34 are provided on the filter 28. The lower end cap 32 is adapted to abut against the housing 36 of the relief valve assembly 35, which is normally closed and which opens in the event a predetermined pressure is attained within shell 12, to return oil to the liquid circulating system 18. Included in the valve assembly 35 is a resilient spring 38 which biases the valve plate 40 into engagement with the diaphragm 42. The diaphragm 42 abuts the retainer 44 which is adapted to hold the check valve 26 in position against the end plate 16. When valve plate 40 is raised from its seat, oil may flow from the inlet means 19 to the outlet 18 and bypass the filter media 28 and 30. This will occur when the differential pressure through the filters exceed 15 PSI.

The end cap 34 includes a portion 46 that overlays the end of the filter 28 and a central depending portion 48 having a foraminous wall. The second stage filter media or filter disc 30 is carried in the end cap 34. It is of complementary configuration to that of the end cap 34 and the outer circumferential wall of the generally cylindrical filter disc 30 abuts the inners cylindrical wall of the end cap 34. The first and second filter elements 28 and 30 are retained in position within the casing 12 by spring 50 which abuts the top of the end cap 34 and urges the filter 28 into engagement with the housing 36 of the valve assembly 35.

Figure 2:
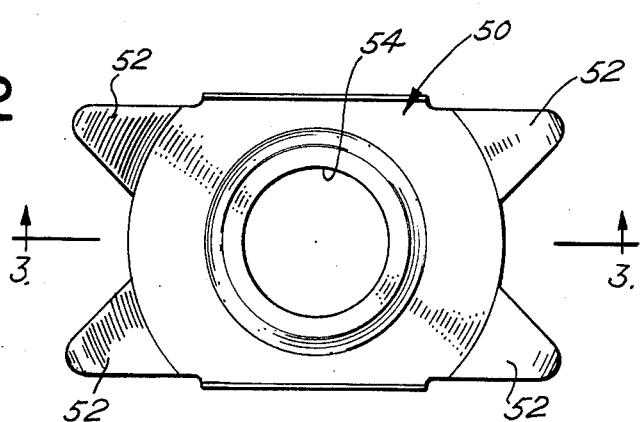
FIG. 2 is a plan view of the retaining spring for the primary filter media in the filter.
Figure 3:
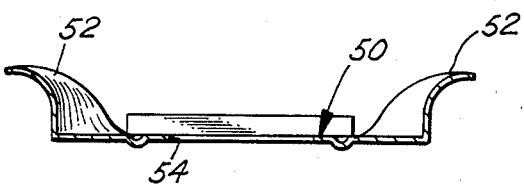
FIG. 3 is a cross section of the retaining spring taken generally along the line 3—3 of FIG. 2.

Turning to FIGS. 2 and 3, there is better shown the configuration of the spring 50. The spring 50 has a central body portion and a plurality of up-turned resilient tabs or projections 52. There is a central opening 54 within the spring 50 for permitting the ready flow of lubricant through the opening 54 on to the filter 30. The projections 52 are resilient such that when the filter units 28 and 30 are assembled within the casing 12, the filter element 28 will be biased into engagement within the housing 36 so as to firmly position the filter elements 28, 30 within the shell 12.

With reference to FIG. 1 and FIGS. 4, 5, and 6, the operation of the novel filter assembly 10 of the present invention will be better understood. Oil will enter the casing 12 through the inlet ports 19. When the filter is clean, substantially all of the oil will flow through the filter element 28 as indicated in FIG. 4. The pleated paper filter element 28 is constructed and arranged so as to trap extremely small articles. Since the pleated paper element 28 alone would soon clog and plug with contaminant from the oil flowing through the filter from the lubricant circulating system within which the filter assembly 19 is associated, an additional fluid filtration path is provided through the secondary filter 30.

As the filter element 28 begins to remove contamination from the oil, the differential pressure increases from the initial restriction of approximately 1 PSI due to the oil passageways through the filter element 28 becoming partially blocked. The partial blockage of the flow path through the filter element 28 increases the filtering efficiency, removing even small particles.

As the differential pressure reaches approximately 3 PSI, oil flow begins through the second filter element 30. The high density of the secondary filter element 30 provides filtration efficiency that approaches 100%. FIG. 5 is a schematic of the first and second filter elements 28 and 30, respectively, illustrating the commencement of oil flow through the second filter 30.

As the differential pressure approaches the point at which a conventional filter would cause the by-pass valve therein to open, the second filter element 30 will deform as indicated generally in FIG. 6. The center of the second filter element 30 takes a concave form on the upstream or high pressure side effectively providing a variable density filter. This concavity reduces the diameter of the disc thereby pulling a portion of the sides of the disc 30 away from the end cap 34. The net effect of this deformation is to reduce the length of the flow path through the disc not only at the center but also at the inner face between the disc 30 and the end cap 34 to relieve a portion of the differential pressure, without opening an unfiltered path for the oil to return to the lubricating circulating system. Whereas, the opening of the by-pass valve in a conventional design would dump unfiltered fluid back through the lubricant circulating system, the novel design of the present invention provides continued filtration of the fluid.

There has been provided by the present invention a relatively inexpensive two stage filter assembly that increases filtering efficiency above that of conventional commercial designs. The porosity and the configuration of the second filter element provide for a high efficiency in normal filtration use and relieve some of the differential pressure, if the second filter element is clogged with contaminant, to permit continued filtration of fluid without dumping of unfiltered fluid back to the lubricating circulating system.

While I have shown a presently preferred embodiment of the present invention, it will be understood that the invention may take other forms within the scope of the appended claims.

What is claimed:

1. In a multi-stage filter unit comprising a hollow housing having one closed end and the other end being closed except for means defining a pair of ports providing respectively a liquid inlet and a liquid outlet, a first annular filter element in said housing having means defining a central opening therethrough and a second filter element in said housing disposed within said opening, the improvement comprising said liquid passing substantially through only the first filter element when the liquid is clean, and then passing through the second filter element as the first filter element clogs, said second filter element being a porous disc retained in said opening by a foraminous element including a cylindrical portion, said porous disc being deformable in response to increase in differential pressure due to clogging of the porous disc after clogging of the first filter element to reduce the length of the liquid flow path through the porous disc and relieve some of the fluid pressure, without opening an unfiltered path for liquid, the disc center portion being deformed concavely and the circumference of the disc being moved inwardly from the adjacent inner circumferential surface of the cylindrical portion of the foraminous element as the disc center portion is deformed concavely to reduce the length of the flow path through the disc.

2. A filter unit as in claim 1 wherein the disc is cylindrical and retained in said cylindrical portion, with the circumference of the disc engaging the inner circumferential surface of the cylindrical portion.

3. A filter unit as in claim 2 wherein the disc is of substantially uniform depth when clean.

4. In a multi-stage filter unit comprising a hollow housing having one closed end and the other end being closed except for means defining a pair of ports providing respectively a liquid inlet and a liquid outlet, a first annular filter element in said housing having means defining a central opening therethrough and a second filter element in said housing disposed within said opening, the improvement comprising said liquid passing substantially through only the first filter element when the liquid is clean, and then passing through the second filter element as the first filter element clogs, said second filter element being a porous disc retained in said opening by a foraminous element having a cylindrical portion, said porous disc being of substantially uniform depth when clean, said porous disc being deformable in response to increase in differential pressure due to clogging of the porous disc after clogging of the first filter element to reduce the length of the liquid flow path through the porous disc and relieve some of the fluid pressure, without opening an unfiltered path for liquid, the disc center portion being deformed concavely and the circumference of the disc being moved inwardly from the adjacent inner circumferential surface of the cylindrical portion of the foraminous element as the disc center portion is deformed concavely to reduce the length of the flow path through the disc.

5. In a multi-stage filter unit comprising a hollow housing having means defining a pair of ports therein providing respectively a liquid inlet and a liquid outlet, a first annular filter element in said housing having means defining an opening therethrough and a second filter element in said housing disposed within said opening, the improvement comprising said second filter element being a porous disc, means for retaining said porous disc in said opening, said porous disc engaging the retaining means at its circumference, whereby all liquid flow through said opening is through said porous disc, said porous disc being deformable in response to increase in differential pressure due to clogging of the porous disc to reduce the length of the liquid flow path through the porous disc and relieve some of the differential pressure, the center portion of the disc being deformed concavely and a portion of the circumferential surface of the disc being moved inwardly from the adjacent inner circumferential surface of the retaining means as the disc center portion is deformed concavely to reduce the length of the flow path through the disc, without opening an unfiltered path for liquid.

6. A filter unit as in claim 5 wherein the second filter element is formed from a high density polyester resin.

* * * * *